United States Patent [19]

Cutler

[11] Patent Number: 4,559,997
[45] Date of Patent: Dec. 24, 1985

[54] SHELL AND TUBE HEAT EXCHANGER WITH TUBE TOP END WIPER TO FREE SOLIDS

[75] Inventor: Donald R. Cutler, Bolingbrook, Ill.

[73] Assignee: Chicago Bridge & Iron Company, Oak Brook, Ill.

[21] Appl. No.: 561,227

[22] Filed: Dec. 14, 1983

[51] Int. Cl.[4] .............................................. F28G 3/12
[52] U.S. Cl. ........................................ 165/94; 62/71; 62/354; 165/109.1
[58] Field of Search ...................... 165/94, 95, 104.16, 165/109 R, 119; 62/354, 71

[56] References Cited

U.S. PATENT DOCUMENTS

| | | | |
|---|---|---|---|
| Re. 25,950 | 12/1965 | Mueller et al. | 62/354 X |
| 2,066,431 | 1/1937 | Taylor | 62/354 X |
| 3,884,135 | 5/1975 | Löhr et al. | 165/94 X |

Primary Examiner—Sheldon J. Richter
Attorney, Agent, or Firm—Marshall, O'Toole, Gerstein, Murray & Bicknell

[57] ABSTRACT

A falling film freeze exchanger, heat exchanger or crystallizer having a plurality of spaced apart vertical tubes secured in, and penetrating, an upper circular tube sheet and a lower circular tube sheet; each tube having a top end and a bottom end; a circular cylindrical shell around the tube sheets and connected thereto; the shell having a heat exchange fluid inlet and a heat exchange fluid outlet for circulating heat exchange fluid around the tubes between the tube sheets; a header surrounding and joined to the upper part of the shell and extending above the top tube sheet and above the top end of the tubes; means to deliver a liquid process feed stream into the header; and wiper means, adapted to rotate about a vertical axis, in contact with the top ends of the tubes.

6 Claims, 12 Drawing Figures

FIG. 3
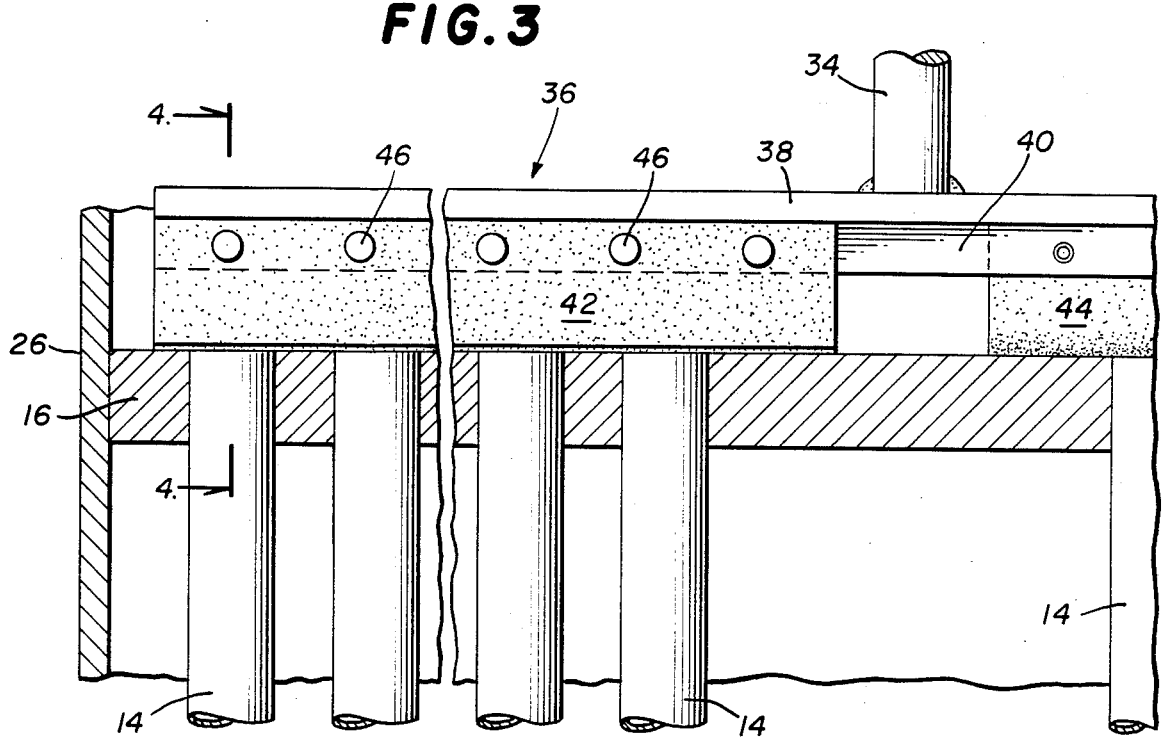
FIG. 6
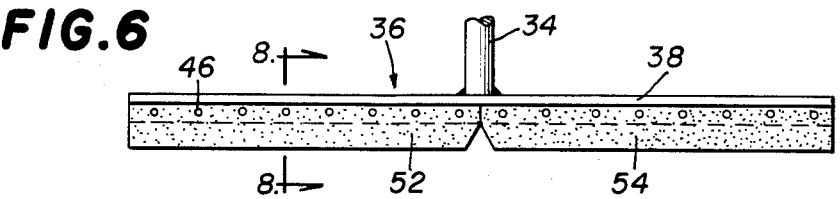
FIG. 4
FIG. 5
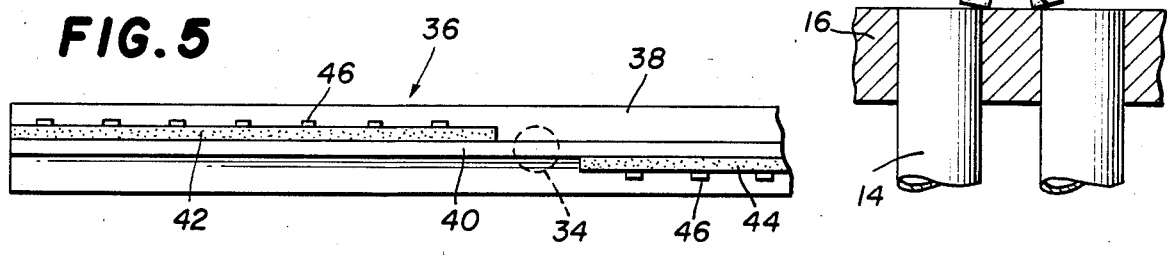
FIG. 7
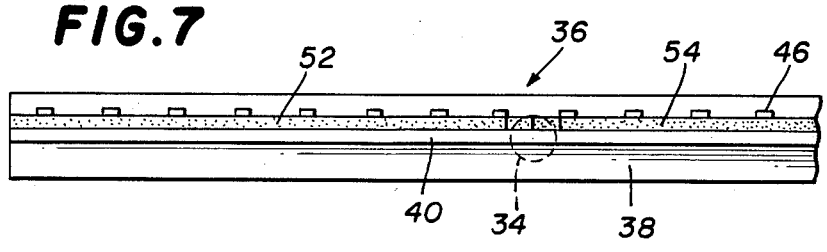
FIG. 8
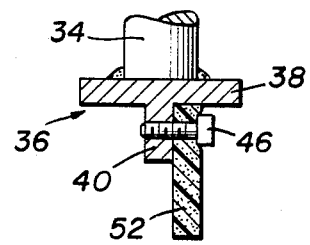

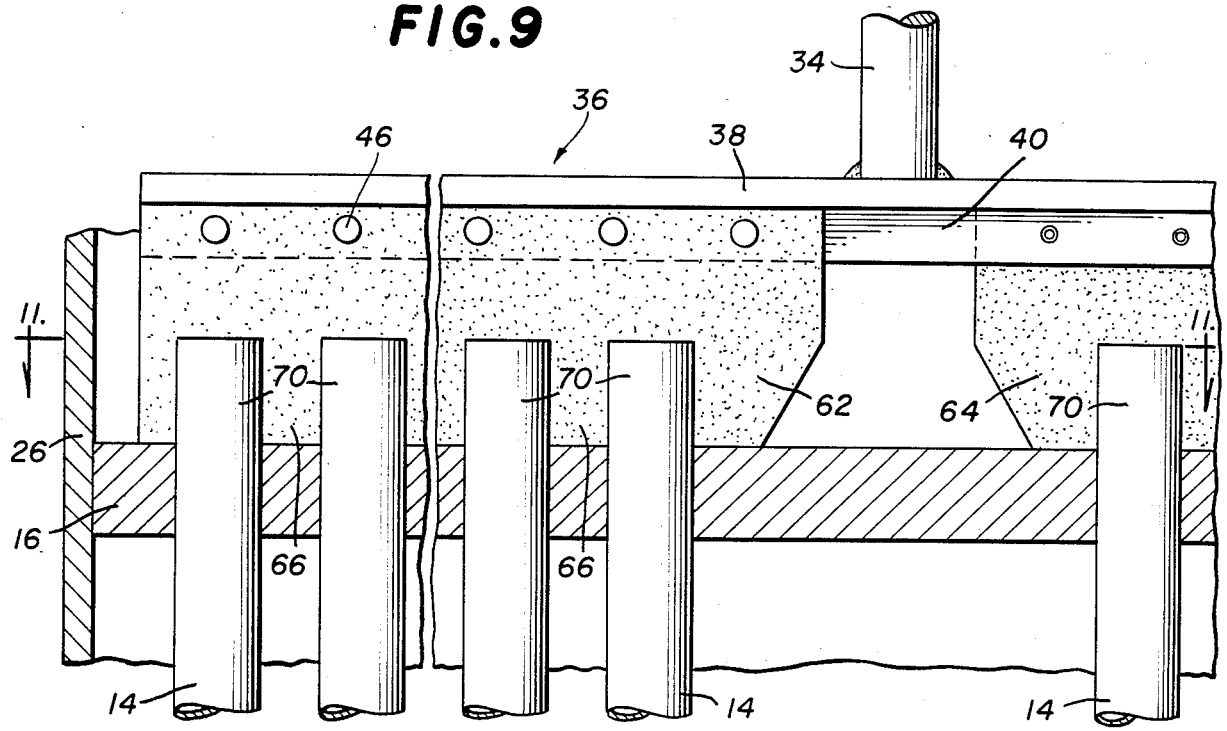
FIG. 9
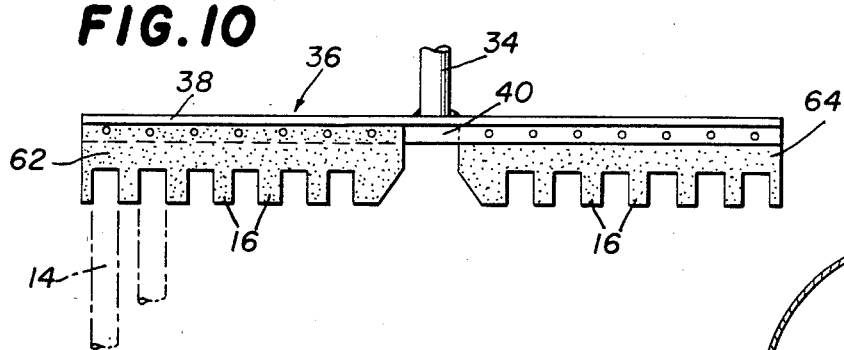
FIG. 10
FIG. 12
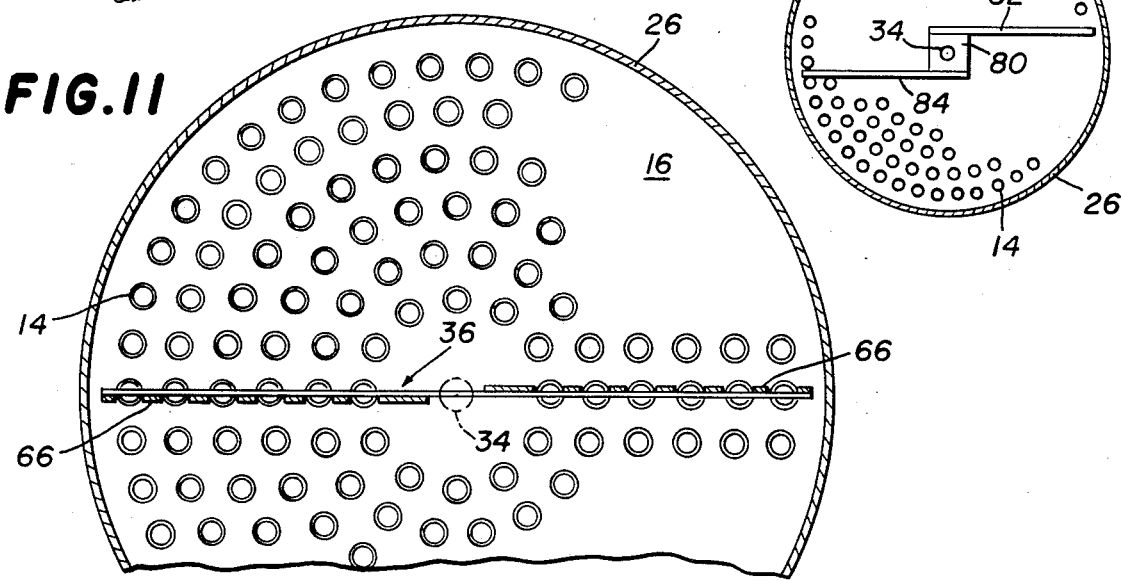
FIG. 11

SHELL AND TUBE HEAT EXCHANGER WITH TUBE TOP END WIPER TO FREE SOLIDS

This invention relates to freeze exchangers for concentrating a solution or dispersion of a solid material, such as an aqueous liquid mixture including fruit and vegetable juices, seawater and brackish water. More particularly, this invention is concerned with improved vertical sheel and tube freeze exchangers, heat exchangers and crystallizers having a wiper to remove and prevent build-up of frozen solvent or crystallized solute on the top ends of the tubes.

BACKGROUND OF THE INVENTION

It is often necessary, or at least desirable, to concentrate a liquid mixture by removing a portion of the solvent, often water, from the liquid mixture. The resulting product, therefore, is in a more concentrated form.

It has been common to concentrate fruit and vegetable juices such as orange juice, grapefruit juice, grape juice, and tomato juice by evaporation to remove water. In addition, seawater and brackish water have been concentrated by evaporation, although the condensed vapor has been recovered as usable potable water rather than discarded as in concentrating fruit and vegetable juices. Nevertheless, each is a concentrating process. In the case of juice, the concentrate is the desirable product, whereas in obtaining potable water from seawater or brackish water the concentrate is discarded.

Evaporative concentration as described, as well as evaporation of chemical solutions or liquid dispersions, requires substantial energy since it relies on the latent heat of vaporization. Scaling of equipment and enhanced corrosion are often inherent at the temperatures involved in evaporative concentration. Loss of flavor and aroma also result during evaporative concentration of food products.

Because of the shortcomings involved in evaporative concentration, it has been found advantageous to freeze concentrate many products, particularly those having water as the liquid carrier. Generally, reduced energy is required since freeze concentrating relies on the heat of fusion instead of the heat of evaporation. In such a process, water is removed by first producing ice crystals which are then separated from the concentrate in a concentrator or separator vessel. Next, the ice crystals are washed in a washer vessel to remove the concentrate remaining on them. The ice crystals can then be discarded or melted if potable water is desired.

Ogman U.S. Pat. No. 4,091,635 in part discloses freeze crystallizing in one vessel and then feeding an ice slurry to a wash column where the ice is separated and washed.

Nail U.S. Pat. No. 4,341,085 discloses freeze concentration apparatus which uses either a horizontal or vertical shell and tube freeze exchanger and a separate vessel for separating and washing the ice which is produced in the freeze exchanger. Engdahl U.S. Pat. No. 4,314,455 contains a similar disclosure.

In vertical shell and tube freeze exchangers, the top or upper ends of the spaced apart tubes are often made flush with the top surface of the upper tube sheet. Liquid fed to the top surface of the tube sheet often is not uniformly distributed to each tube mouth so that a constant falling film thickness and rate are not obtained. This adversely affects cooling efficiency. To improve liquid distribution to the tubes, the upper ends of the tubes are sometimes extended as, for example, about two to twenty-four inches above the tube sheet surface.

Another problem in operating a freeze exchanger of the vertical sheel and tube type is that a build-up of frozen solvent develops on the top end or edge of the tubes, and along the outer surface of the tubes when the tubes extend higher than the upper tube sheet. This build-up of frozen solvent, which is ice when water is the solvent or liquid carrier, can progress until liquid flow into the tubes is greatly retarded and even reduced to where nearly all flow is stopped. When this occurs the freeze exchanger must be taken out of operation and the frozen solvent melted to unplug the tubes. This represents a loss since the plant must be taken out of production for a substantial time.

The described build-up of solids is not limited to freeze exchangers but also can occur in heat exchangers operating at elevated temperatures and also in crystallizers in which a solute is solidified out of solution.

Clearly, a need exists for apparatus and methods which prevent or reduce build-up of frozen solvent, liquid carrier or a solute on the top ends of the tubes.

SUMMARY OF THE INVENTION

According to the invention, a falling film freeze exchanger, heat exchanger or crystallizer is provided comprising a plurality of spaced apart vertical freeze tubes secured in, and penetrating, an upper circular tube sheet and a lower circular tube sheet; each tube having a top end and a bottom end; a circular cylindrical shell around the tube sheets and connected thereto; the shell having a heat exchange fluid inlet and a heat exchange fluid outlet for circulating heat exchange fluid around the tubes between the tube sheets; a header surrounding and joined to the upper part of the shell and extending above the top tube sheet and above the top end of the tubes; means to deliver a liquid process feed stream into the header; and wiper means, adapted to rotate about a vertical axis, in contact with the top ends of the tubes on which a solid deposits. The wiper means scrapes off solids which form on the tube ends and also suppresses formation of deposits at those locations.

Desirably, the wiper means includes an elastomeric strip having a horizontal edge adapted to contact the top ends of the tubes. The elastomeric strip can be removably joined to a rigid rotatable support.

The wiper means rigid rotatable support can comprise one or more arms radially positioned from the vertical axis. If desired, the one or more arms can be offset radially from the axis and be lateral to a radius from the axis. Such arms can have an elastomeric strip mounted thereon to do the wiping.

The rigid rotatable support can be connected to a vertical shaft axially positioned with respect to the upper circular tube sheet, and power means can be operatively connected to the shaft to drive it.

The top end of the tubes can terminate at the top surface of the upper tube sheet, or the top ends of the tubes can terminate in a horizontal plane above the upper tube sheet upper surface.

When the tube ends project above the upper tube sheet and the wiper means is an elastomeric strip having a horizontal lower edge adapted to contact the top ends of the tubes, the wiper means can include fingers depending downwardly between adjacent tubes. The fingers can be adapted to wipe at least part of the tube outside surfaces, at least at the top ends of the tubes.

The fingers can be made of elastomeric material and extend downward from the elastomeric strip. The fingers can be integral with the strip or separate elements or parts.

Although the invention is primarily concerned with a freeze exchanger having a wiping means, the invention is also applicable to other heat exchangers, and also to crystallizers, in which there is a build-up of solids on the ends of tubes which can be freed by a wiper means.

BRIEF DESCRIPTION OF THE DRAWINGS

FIG. 3 is an enlarged view of the upper end of some of the tubes and the wiper;

FIG. 4 is a sectional view taken along the line 4—4 of FIG. 3 and shows the wiper strip in two pieces with one piece on each side of a support bar;

FIG. 5 is a bottom view, looking up, at the wiper shown in FIGS. 3 and 4;

FIG. 6 illustrates a second embodiment of wiper with the elastomeric wiper strip in two pieces joined to the same side of a support bar;

FIG. 7 is a bottom view, looking up, at the wiper shown in FIG. 6;

FIG. 8 is an end view of the wiper shown in FIGS. 6 and 7.

FIG. 9 is a vertical sectional view, partially broken away, of part of a freeze exchanger in which the top ends of the tubes extend above the upper tube sheet and the wiper has fingers which contact and wipe the side surfaces of the tube top ends;

FIG. 10 is an elevational view of the full wiper shown in FIG. 9;

FIG. 11 is a sectional view taken along the line 11—11 of FIG. 9; and

FIG. 12 is a plan view of the upper end of a freeze exchanger having a wiper with radially offset arms.

DETAILED DESCRIPTION OF THE DRAWINGS

Figures 1, 2:
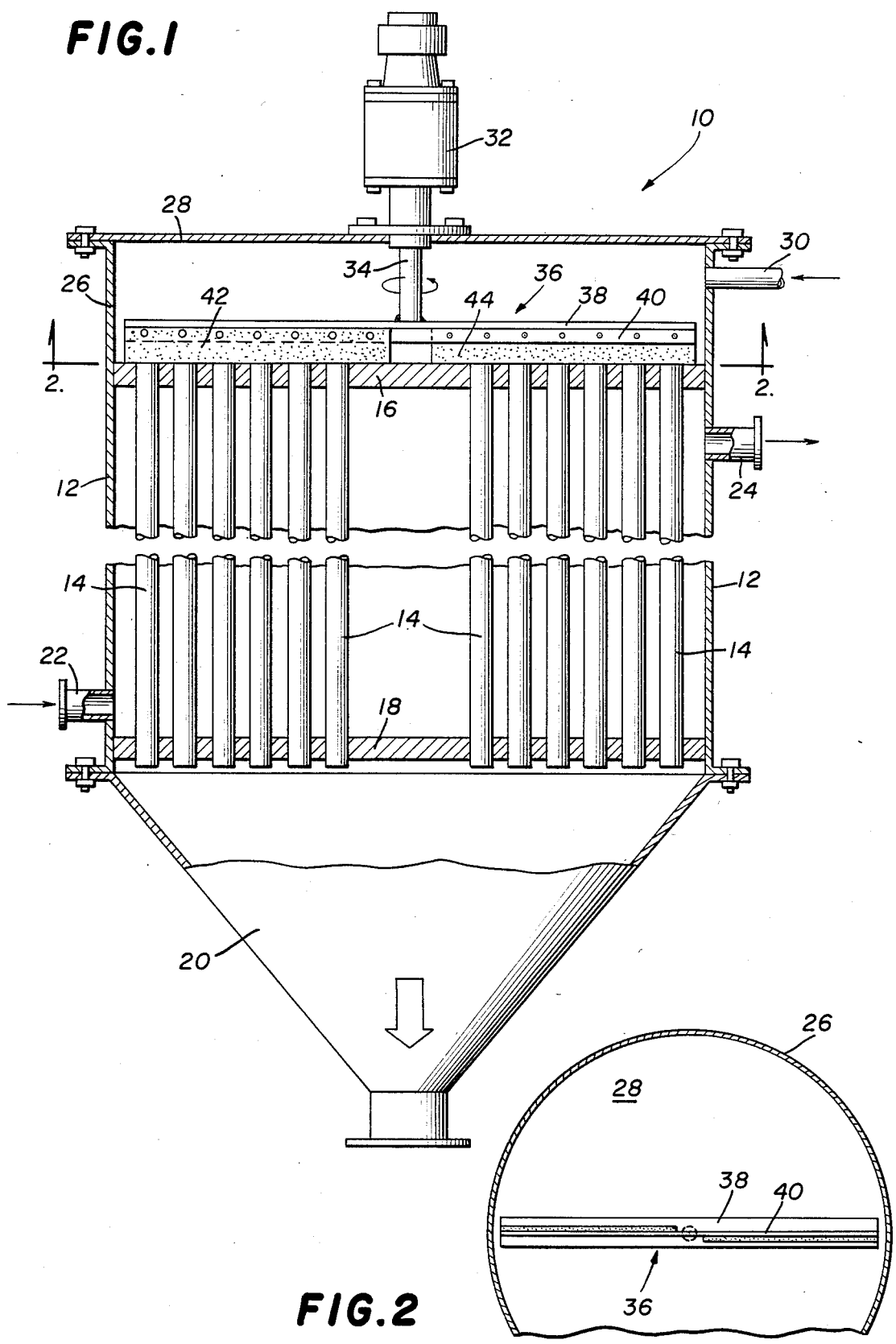
FIG. 1 is a front elevational view, partly in section and partly broken away, showing a shell and tube freeze exchanger having a wiper which contacts the top end of the tubes.
FIG. 2 is a sectional view taken along the line 2—2 of FIG. 1.

To the extent it is reasonable and practical, and facilitates clarity, the same numbers will be used in the various views of the drawings to identify the same or similar elements or parts.

The subsequent discussion of the drawings is directed to the invention in terms of a freeze exchanger. However, the apparatus can also be used as a heat exchanger or crystallizer.

With the reference to FIG. 1, freeze exchanger 10 has a circular cylindrical metal shell 12 and a plurality of vertical metal freeze tubes 14. The tubes 14 are secured in, and penetrate, spaced apart upper circular tube sheet 16 and lower tube sheet 18. The tube sheets 16 and 18 are joined to the metal shell 12, such as by welding.

Conduit 22 communicates with the lower interior space of shell 12 and is used to supply a cooling fluid to the shell interior. Cooling fluid is removed from the shell 12 upper interior space by conduit 24.

The lower end of shell 12 optionally may be provided with a removable conical body 20 to facilitate merging the process liquid exiting the tubes 14 into a single stream for further processing. Alternatively, the outlet streams exiting from the tubes can flow directly to a receiving tank.

Included as an extension of shell 12 is a header 26 which has a removable cover 28 at the top. Process liquid inlet 30 is provided in the header 26 so that the liquid can be fed into the header space and thereby flow to the top ends of the tubes 14.

The header cover 28 supports a motor 32, the vertical shaft 34 of which penetrates that cover and extends into the space defined by header 26. Attached to the lower end of the shaft 34 is a T-shaped bar 36 which has a top flat flange 38 and a vertical web 40. Two identical elastomeric strips 42 and 44 are attached to the vertical web 40 by fasteners 46. The stripes 42 and 44 are attached on opposite sides of web 36 as shown in FIGS. 2 to 5 and each strip extends radially away in a direction opposite from that of the other strip. An open space is provided between the inner ends of strips 42 and 44 since no tubes are usually located there.

The lower edges of strips 42 and 44 will simultaneously contact the upper surface of upper tube sheet 16 as well as the top ends of tubes 14 since the tube top ends are flush with the tube sheet surface. Accordingly, when shaft 34 is rotated the strips 42 and 44 will contact any ice build-up on the tube sheet 16 and top end of each of the tubes and scrape it loose, thereby preventing ice deposits from building up and obstructing liquid flow to the tubes.

By arranging the elastomeric strips 42 and 44 on opposite sides of web 40, the rotation of the bar 36 causes the strips to bend or flex in the same direction relative to the web. However, this is not essential since they can flex in opposite directions as shown by the embodiment illustrated by FIGS. 6 to 8.

With reference to FIGS. 6 to 8, the two separate elastomeric strips 52 and 54 are connected to the same side of web 40 by fasteners 46. Accordingly, when bar 36 rotates, strips 52 and 54 in opposite directions relative to the web 40. This is generally of not much significance unless it is desired to have both the strips press against the web 40 as a reinforcing backing.

The embodiments illustrated by FIGS. 1 to 8 can be used regardless of the pattern used for arranging the tubes in the tube sheets. However, the embodiment illustrated by FIGS. 9 to 11 is intended to be used in a freeze exchanger in which the tubes are arranged in concentric circular patterns.

As shown in FIGS. 9 to 11, a pair of identical elastomeric strips 62 and 64 is attached to opposite sides of web 40 is a radially opposing arrangement. Each strip 62 and 64 has integral downwardly projecting fingers 66 which extend between the top ends 70 of tubes 14 which extend above the upper surface of upper tube sheet 16. The width of fingers 66 is equal to or slightly greater than the radial space between adjacent concentric circular rows of tubes 14 so that the edges of the fingers can scrape the sides of tubes in two adjacent rows simultaneously. Further, at the same time that the sides of the tubes are scraped, the top edge of the tubes is also scraped by the horizontal edge of strips 62 and 64, between the fingers 66, which contacts the tube top edges. Although the lower edge of the fingers 66 is shown in FIGS. 9 to 11 in contact with the upper surface of the tube sheet, it is very often unnecessary for the fingers to project down that far since ice deposits usually form near the top edges of the tubes.

The elastomeric strips 42, 44; 52, 54; and 62, 64, can be made of any suitable material, including rubber, Teflon type polymers and blends of synthetic polymers having reasonable flexibility.

FIG. 12 illustrates the upper end of a freeze exchanger in which the shaft 34 supports a rotatable drive block 80 having arms or plates 82, 84 joined to opposite vertical sides of the block. Each arm or plate can be provided with an elastomeric strip 42, 44 or 62, 64 as shown in the other embodiments of the invention. Each of the arms 82, 84 is displaced radially, and is lateral to a radius, from the center of shaft 34. When a wiper as shown in FIG. 12 rotates counterclockwise, the arms move the solids from the central portion to the perimeter. Clockwise movement of the arms 82, 84 tends to move solids from the perimeter to the central portion of the freeze exchanger top or upper portion. Such action permits ready control of accumulated solids which are freed by the wiping action as well as of solids in the feed stream.

The foregoing detailed description has been given for clearness of understanding only, and no unnecessary limitations should be understood therefrom, as modifications will be obvious to those skilled in the art.

What is claimed is:

1. A falling film freeze exchanger, heat exchanger or crystallizer comprising:
   a plurality of spaced apart vertical freeze tubes secured in, and penetrating, an upper circular tube sheet and a lower circular tube sheet;
   each tube having a top end and a bottom end;
   a circular cylindrical shell around the tube sheets and connected thereto;
   the shell having a heat exchange fluid inlet and a heat exchange fluid outlet for circulating heat exchange fluid around the tubes between the tube sheets;
   a header surrounding and joined to the upper part of the shell and extending above the top tube sheet and above the top end of the tubes;
   means to deliver a liquid process feed stream into the header; and
   a wiper blade within said header and located entirely outside of the tubes adapted to rotate about a vertical axis, and contact the top ends of a plurality of the tubes.

2. A falling film freeze exchanger, heat exchanger or crystallizer according to claim 1 in which the wiper blade includes an elastomeric strip having a horizontal edge adapted to contact the top ends of the tubes.

3. A falling film freeze exchanger, heat exchanger or crystallizer according to claim 2 in which the elastomeric strip is removably joined to a rigid rotatable support.

4. A falling film freeze exchanger, heat exchanger or crystallizer according to claim 3 in which the rigid rotatable support is connected to a vertical shaft axially positioned with respect to the upper circular tube sheet, and power means to drive the shaft.

5. A falling film freeze exchanger, heat exchanger or crystallizer according to claim 1 in which the top end of the tubes terminate at the top surface of the upper tube sheet.

6. A falling film freeze exchanger, heat exchanger or crystallizer according to claim 1 in which the wiper blade includes at least one radially offset arm which is laterally positioned to a radius extending from the axis.

* * * * *

UNITED STATES PATENT AND TRADEMARK OFFICE
CERTIFICATE OF CORRECTION

PATENT NO. : 4,559,997
DATED : December 24, 1985
INVENTOR(S) : DONALD R. CUTLER

It is certified that error appears in the above-identified patent and that said Letters Patent is hereby corrected as shown below:

Column 1, line 10, and column 2, line 5, change "sheel" to -- shell --; column 4, line 14, change "stripes" to -- strips -- and in line 38, after "54" insert -- flex --.

Signed and Sealed this

Twenty-fifth Day of February 1986

[SEAL]

Attest:

DONALD J. QUIGG

Attesting Officer

Commissioner of Patents and Trademarks